United States Patent
Takobe et al.

(10) Patent No.: US 11,550,349 B2
(45) Date of Patent: Jan. 10, 2023

(54) LINEAR POWER SUPPLY CIRCUIT

(71) Applicant: ROHM CO., LTD., Kyoto (JP)

(72) Inventors: Isao Takobe, Kyoto (JP); Yuhei Yamaguchi, Kyoto (JP); Yukihiro Watanabe, Kyoto (JP); Shingo Hashiguchi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 17/283,389

(22) PCT Filed: Oct. 21, 2019

(86) PCT No.: PCT/JP2019/041354
§ 371 (c)(1),
(2) Date: Apr. 7, 2021

(87) PCT Pub. No.: WO2020/090551
PCT Pub. Date: May 7, 2020

(65) Prior Publication Data
US 2021/0382510 A1     Dec. 9, 2021

(30) Foreign Application Priority Data

Oct. 31, 2018  (JP) .............................. JP2018-205811
Apr. 11, 2019  (JP) .............................. JP2019-075510

(51) Int. Cl.
*G05F 1/575*     (2006.01)
*B60R 16/03*     (2006.01)

(52) U.S. Cl.
CPC .............. *G05F 1/575* (2013.01); *B60R 16/03* (2013.01)

(58) Field of Classification Search
None
See application file for complete search history.

(56) References Cited

U.S. PATENT DOCUMENTS

| 6,369,554 B1 | 4/2002 | Aram | |
| 6,707,340 B1* | 3/2004 | Gough | H03F 1/083 323/273 |
| 7,656,224 B2* | 2/2010 | Perez | H03F 1/0261 327/540 |

(Continued)

FOREIGN PATENT DOCUMENTS

| CN | 1320852 | 11/2001 |
| CN | 101581947 | 11/2009 |

(Continued)

OTHER PUBLICATIONS

Japan Patent Office, International Search Report for PCT/JP2019/041354 dated Jan. 7, 2020 with English translation.

*Primary Examiner* — Thomas J. Hiltunen
(74) *Attorney, Agent, or Firm* — Fish & Richardson P.C.

(57) ABSTRACT

A linear power supply circuit according to the present invention is provided with: an output transistor provided between an input end to which an input voltage is applied and an output end to which an output voltage is applied; a driver for driving the output transistor; and a feedback unit for feeding, back to the driver, information about an output electrical current that is output from the output end. The driver drives the output transistor on the basis of the difference between a voltage based on the output voltage and a reference voltage, as well as the information.

6 Claims, 7 Drawing Sheets

(56) References Cited

U.S. PATENT DOCUMENTS

| | | | |
|---|---|---|---|
| 7,969,127 B1* | 6/2011 | Megaw | G05F 1/613 |
| | | | 323/226 |
| 8,390,491 B2* | 3/2013 | Wakimoto | H03F 3/345 |
| | | | 341/135 |
| 8,660,739 B2* | 2/2014 | Gafford | G06Q 10/087 |
| | | | 701/29.1 |
| 9,134,743 B2* | 9/2015 | Bisson | G05F 1/575 |
| 9,354,649 B2* | 5/2016 | Ho | G05F 1/56 |
| 9,575,499 B2* | 2/2017 | Lee | G05F 1/575 |
| 10,001,795 B2* | 6/2018 | Jefremow | G05F 1/575 |
| 10,338,617 B2* | 7/2019 | Fujimoto | H02H 9/025 |
| 10,503,188 B2* | 12/2019 | Ramos | G05F 1/565 |
| 10,908,626 B2* | 2/2021 | Nagata | G05F 3/262 |
| 11,068,003 B2* | 7/2021 | Takobe | G05F 1/59 |
| 2001/0028240 A1 | 10/2001 | Fukui | |
| 2002/0057079 A1 | 5/2002 | Horie | |
| 2013/0033247 A1 | 2/2013 | Endo et al. | |
| 2013/0113447 A1* | 5/2013 | Kadanka | G05F 1/563 |
| | | | 323/280 |
| 2013/0307506 A1* | 11/2013 | Oh | G05F 1/575 |
| | | | 323/282 |
| 2016/0048148 A1 | 2/2016 | Lee et al. | |
| 2016/0299518 A1 | 10/2016 | Iwata et al. | |

FOREIGN PATENT DOCUMENTS

| | | |
|---|---|---|
| CN | 102915065 | 2/2013 |
| CN | 104812121 | 7/2015 |
| CN | 105446403 | 3/2016 |
| CN | 205092772 | 3/2016 |
| CN | 108649798 | 10/2018 |
| JP | 2001-282372 | 10/2001 |
| JP | 2002-149245 | 5/2002 |
| JP | 2003-084843 | 3/2003 |
| JP | 2009-277233 | 11/2009 |
| JP | 2012-53580 | 3/2012 |
| JP | 2013-37469 | 2/2013 |
| JP | 2013-149147 | 8/2013 |
| JP | 2018112963 | 7/2018 |
| KR | 20010095164 | 11/2001 |
| KR | 20130016083 | 2/2013 |

* cited by examiner

LINEAR POWER SUPPLY CIRCUIT

TECHNICAL FIELD

The present disclosure relates to a linear power supply circuit.

BACKGROUND ART

Linear power supply circuits, such as those of an LDO (low dropout) type, are used as a power supplying means in a variety of devices.

An example of known technology related to what has just been mentioned is seen in Patent Document 1 identified below.

List of Citations

PATENT LITERATURE

Patent Document 1: JP-A-2003-84843

SUMMARY OF THE INVENTION

Problem to be Solved by the Invention

The linear regulator proposed in Patent Document 1 feeds information on the regulated output voltage (the output voltage of the linear regulator) back to an amplifier, and this causes phase lags at different points in the amplifier. Accordingly, with the linear regulator proposed in Patent Document 1, it is difficult to obtain desired frequency characteristics, and thus such measures are needed as adding a phase compensation circuit for complementing phase compensation with an output capacitor, or using a larger output capacitor.

In view of the circumstances described above, the present invention is aimed at providing a linear power supply circuit with which the desired frequency characteristics can be obtained easily.

Means for Solving the Problem

To achieve the above object, according to one aspect of the present invention, a linear power supply circuit includes: an output transistor provided between an input terminal, to which an input voltage is applied, and an output terminal, to which an output voltage is applied; a driver configured to drive the output transistor; and a feedback circuit configured to feed, back to the driver, information on the output current fed out via the output terminal, and the driver is configured to drive the output transistor based on, on one hand, the difference between a voltage based on the output voltage and a reference voltage, and, on the other hand, based on the information (a first configuration).

In the linear power supply circuit according to the first configuration described above, preferably, the driver includes a differential amplifier configured to output a voltage commensurate with the difference between the voltage based on the output voltage and the reference voltage, and the feedback circuit is configured to feed the information back to a first predetermined point across a first path between the output of the differential amplifier and the output terminal (a second configuration).

In the linear power supply circuit according to the second configuration described above, preferably, the driver further includes: a converter configured to convert a voltage based on the output of the differential amplifier into a current and outputs it; and a current amplifier configured to perform current amplification on the output of the converter, and the feedback circuit is configured to feed the information back to the current amplifier (a third configuration).

In the linear power supply circuit according to the third configuration described above, preferably, the feedback circuit is configured to acquire the information from a second predetermined point across a second path between the input of the current amplifier and the output terminal, and the second predetermined point is located closer, than the first predetermined point, to the output terminal (a fourth configuration).

In the linear power supply circuit according to the fourth configuration described above, preferably, the current amplifier includes a plurality of current-sink current mirror circuits and a plurality of current-source current mirror circuits, the input of one of the current-sink current mirror circuits is the first predetermined point, the feedback circuit is configured to draw a current commensurate with the information from the first predetermined point, and the maximum value of the sum current of the current drawn from the first predetermined point by the feedback circuit and the current drawn from the first predetermined point by the current-sink current mirror circuit of which the input is the first predetermined point does not depend on the output of the converter (a fifth configuration).

The linear power supply circuit according to the fifth configuration described above, preferably, further includes a phase compensation circuit configured to perform phase compensation, and the phase compensation circuit is located elsewhere than between the first and second predetermined points (a sixth configuration).

In the linear power supply circuit according to any one of the second to sixth configurations described above, preferably, the driver further includes a capacitor of which one terminal is fed with the output of the differential amplifier and of which the other terminal is fed with the ground potential, and the supply voltage for the differential amplifier is the voltage based on the output voltage (a seventh configuration).

In the linear power supply circuit according to any one of the third to sixth configurations described above, preferably, the driver further includes a capacitor of which one terminal is fed with the output of the differential amplifier and of which the other terminal is fed with the ground potential, the supply voltage for the differential amplifier is the voltage based on the output voltage, the supply voltage for the converter is the voltage based on the output voltage, and the supply voltage for the current amplifier is a constant voltage (an eighth configuration).

In the linear power supply circuit according to any one of the third to sixth configurations described above, preferably, the driver further includes a capacitor of which one terminal is fed with the output of the differential amplifier and of which the other terminal is fed with the voltage based on the output voltage, and the supply voltages for the differential amplifier and the current amplifier either are a first and a second constant voltage respectively, or are the input voltage (a ninth configuration).

In the linear power supply circuit according to the eighth or ninth configuration described above, preferably, the withstand voltage of the differential amplifier is lower than the withstand voltage of the current amplifier (a tenth configuration).

In the linear power supply circuit according to any one of the eighth to tenth configurations described above, preferably, the gain of the differential amplifier is lower than the gain of the current amplifier (an eleventh configuration).

In the linear power supply circuit according to the first configuration described above, preferably, the output stage of the driver is of a push-pull type (a twelfth configuration).

In the linear power supply circuit according to any one of the first to twelfth configurations described above, preferably, the feedback circuit is configured to negatively feed back to the driver the information in the form of a current (a thirteenth configuration).

According to another aspect of the present invention, a vehicle includes the linear power supply circuit according to any of the first to thirteenth configurations described above (a fourteenth configuration).

Advantageous Effects of the Invention

With a linear power supply circuit according to the present invention, desired frequency characteristics can be obtained easily.

DESCRIPTION OF EMBODIMENTS

1. One Embodiment

Figure 1:
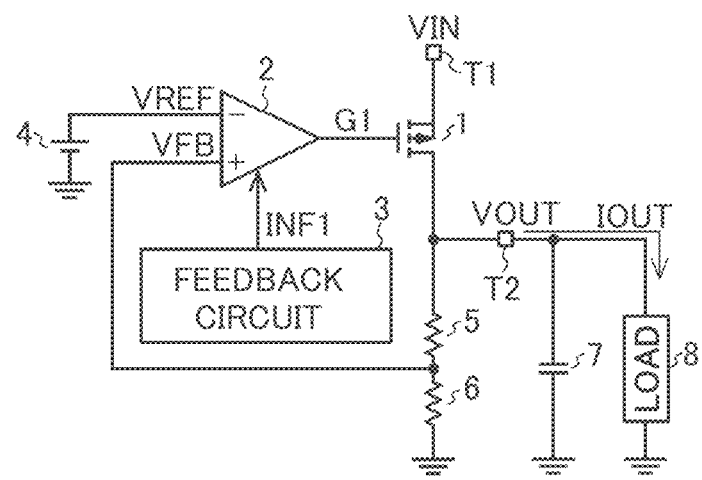
FIG. 1 A diagram showing a configuration of a linear power supply circuit according to one embodiment.

FIG. 1 is a diagram showing a configuration of a linear power supply circuit according to one embodiment. The linear power supply circuit shown in FIG. 1 includes an input terminal T1, an output terminal T2, an output transistor 1, a driver 2, a feedback circuit 3, a reference voltage generator 4, and resistors 5 and 6.

To the linear power supply circuit shown in FIG. 1, an output capacitor 7 and a load 8 are externally connected. Specifically, the output capacitor 7 and the load 8 are, in parallel with each other, externally connected to the output terminal T2. The linear power supply circuit shown in FIG. 1 bucks (steps down) an input voltage VIN to generate an output voltage VOUT, and supplies it to the load 8.

The output transistor 1 is provided between the input terminal T1, to which the input voltage VIN is applied, and the output terminal T2, to which the output voltage VOUT is applied.

The driver 2 drives the output transistor 1. Specifically, the driver 2 feeds a gate signal G1 to the gate of the output transistor 1 to drive the output transistor 1. The conductivity (in other words, the on-resistance value) of the output transistor 1 is controlled by the gate signal G1. In the configuration shown in FIG. 1, a PMOSFET (p-channel MOSFET) is used as the output transistor 1. Thus, the lower the gate signal G1, the higher the conductivity of the output transistor 1, and thus the higher the output voltage VOUT. By contrast, the higher the gate signal G1, the lower the conductivity of the output transistor 1, and thus the lower the output voltage VOUT. Here, as the output transistor 1, an NMOSFET or a bipolar transistor may be used in place of the PMOSFET.

A feedback circuit 3 negatively feeds back to the driver 2 information INF', in the form of a current, on the output current IOUT that is fed out via the output terminal T2.

The reference voltage generator 4 generates a reference voltage VREF. The resistors 5 and 6 generate a feedback voltage VFB which is a division voltage of the output voltage VOUT. Here, if the output VOUT is within the input dynamic range of the driver 2, the resistors 5 and 6 may be omitted, in which case the output voltage VOUT itself may be used as the feedback voltage VFB so that the output voltage VOUT is directly fed to the driver 2.

The non-inverting input terminal (+) of the driver 2 is fed with the feedback voltage VFB, and the inverting input terminal (−) of the driver 2 is fed with the reference voltage VREF. The driver 2 drives the output transistor 1 based on, on one hand, the difference value ΔV (=VFB−VREF) between the feedback voltage VFB and the reference voltage VREF and, on the other hand, the information INF1. The larger the difference value ΔV, the higher the driver 2 makes the gate signal G1; the smaller the difference value ΔV, the lower the driver 2 makes the gate signal G1. Furthermore, based on the information INF1, the larger the output current IOUT, the higher the driver 2 makes the gate signal G1; the smaller the output current IOUT, the lower the driver 2 makes the gate signal G1.

With the linear power supply circuit shown in FIG. 1, the influence, upon the frequency characteristics, of the phase characteristics between a point where the feedback circuit 3 acquires the information INF1 and a point where the feedback circuit 3 feeds back the information INF1 can be controlled by adjusting the amount of feedback, and thus it is possible to obtain the desired frequency characteristics easily.

2. First Configuration Example

Figure 2:
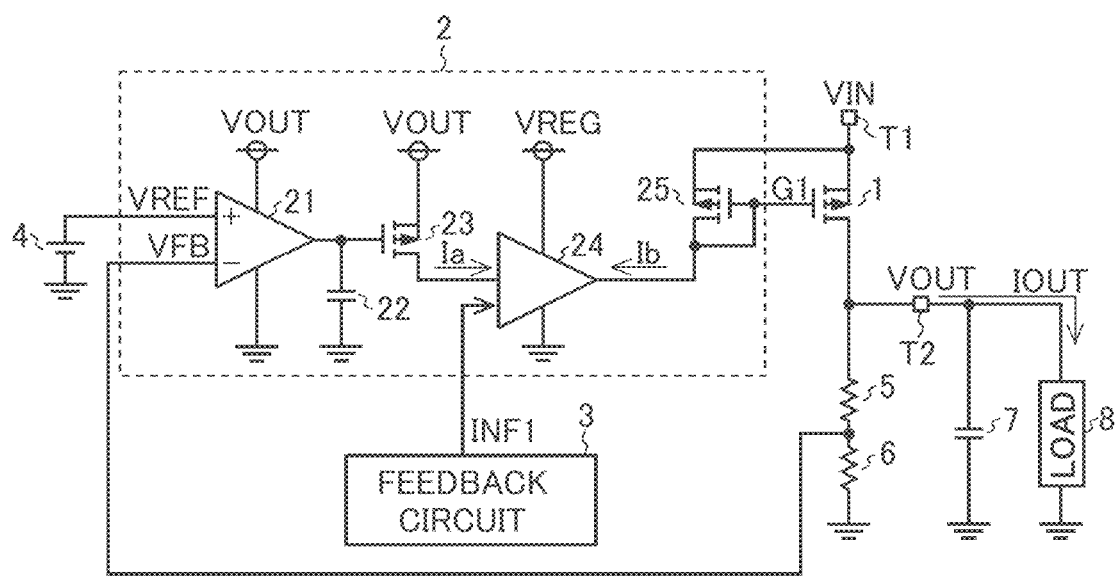
FIG. 2 A diagram showing a first configuration example of the linear power supply circuit shown in FIG. 1.

FIG. 2 is a diagram showing a first configuration example of the linear power supply circuit shown in FIG. 1. In FIG. 2, such parts as find their counterparts in FIG. 1 are identified by common reference signs, and no overlapping description will be repeated.

In this configuration example, the driver 2 includes a differential amplifier 21, a capacitor 22, a PMOSFET 23, a current amplifier 24, and a PMOSFET 25.

The differential amplifier 21 outputs a voltage commensurate with the difference between the feedback voltage VFB and the reference voltage VREF. The supply voltage for the differential amplifier 21 is the output voltage VOUT. That is, the differential amplifier 21 is driven by the voltage between the output voltage VOUT and the ground potential. As the supply voltage for the differential amplifier 21, instead of the output voltage VOUT, a voltage which is lower than the output voltage VOUT and which is in dependence of the output voltage VOUT may be used.

The withstand voltage of the differential amplifier 21 is lower than the withstand voltage of the current amplifier 24. The gain of the differential amplifier 21 is lower than the gain of the current amplifier 24. This helps make the differential amplifier 21 compact.

One terminal of the capacitor 22 is fed with the output of the differential amplifier 21, and the other terminal of the capacitor 22 is fed with the ground potential.

The source of the PMOSFET 23 is fed with the output voltage VOUT, and the gate of the PMOSFET 23 is fed with a voltage based on the output of the differential amplifier 21 (i.e., the voltage at the connection node between the differential amplifier 21 and the capacitor 22). The PMOSFET 23 converts the voltage based on the output of the differential amplifier 21 into a current, which the PMOSFET 23 outputs from its drain. The connection node between the differential amplifier 21 and the capacitor 22 serves as a negative ground in a high-frequency band, and this helps achieve fast response of the driver 2.

The current amplifier 24 performs current amplification on the current Ia that is output from the drain of the PMOSFET 23. The supply voltage for the current amplifier 24 is a constant voltage VREG. That is, the current amplifier 24 is driven by the voltage between the constant voltage VREG and the ground potential.

The feedback circuit 3 feeds the information INF' back to a first predetermined point across a first path between the output of the differential amplifier 21 and the output terminal T2. In the configuration example shown in FIG. 2, the feedback circuit 3 feeds the information INF1 back to the current amplifier 24. Accordingly, the current amplifier 24 outputs a current Ib based on the current Ia, which is output from the drain of the PMOSFET 23, and the information INF'.

The PMOSFET 25, together with the output transistor 1, constitutes a current mirror circuit. The PMOSFET 25 converts the current Ib output from the current amplifier 24 into a voltage, which the PMOSFET 25 feeds to the gate of the output transistor 1.

Figure 3:
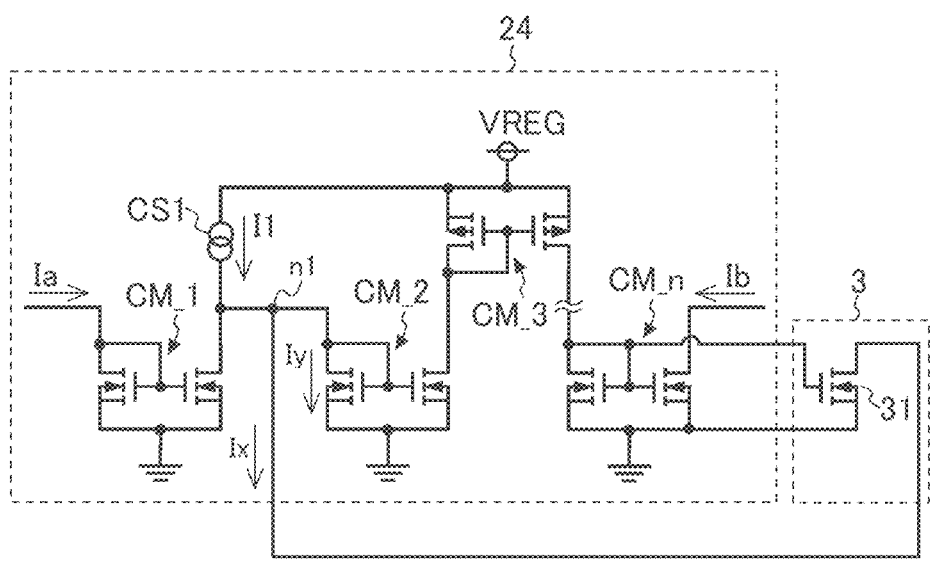
FIG. 3 A diagram showing one configuration example of a current amplifier and a feedback circuit.

FIG. 3 is a diagram showing one configuration example of the current amplifier 24 and the feedback circuit 3. The current amplifier 24 includes current-sink current mirror circuits CM_1, CM_2, . . . CM_n and current-source current mirror circuits CM_3, . . . CM_n−1 (though CM_n−1 is not illustrated in FIG. 3). The current-sink current mirror circuits and the current-source current mirror circuits are alternately arranged, from the input to the output of the current amplifier 24, between, at one end, the current-sink current mirror circuit CM_1 and a constant current source CS1 that produces a constant current I1 and, at the other end, the current-sink current mirror circuit CM_n. To keep poles occurring in the current mirror circuits as far away from a low-frequency band as possible, it is preferable to give each of the current mirror circuits a mirror ratio (the size of the output-side transistor relative to the size of the input-side transistor) of 5 or less.

An NMOSFET 31 that functions as the feedback circuit 3 acquires the information INF' from a second predetermined point across a second path between the input of the current amplifier 24 and the output terminal T2. The second predetermined point is located closer, than the first predetermined point mentioned above, to the output terminal T2. In the configuration example shown in FIG. 3, the NMOSFET 31 acquires the information INF1 from the current mirror circuit CM_n. In this example, the information INF1 is information on the current Ib. The current mirror circuit formed by the PMOSFET 25 and the output transistor 1 generates the output current IOUT commensurate with the current Ib; accordingly, the information INF1 is information on the output current IOUT. The NMOSFET 31 feeds the information INF1 back to the connection node between the current-sink current mirror circuit CM_1 and the constant current source CS1.

In the configuration example shown in FIGS. 2 and 3, the transconductance of a transconductance amplifier formed by the differential amplifier 21 and the PMOSFET 23 is represented by gm, the gain of the current amplifier 24 is represented by A, and the current feedback rate of the feedback circuit 3 is represented by K. The mirror ratio of the current mirror circuit formed by the PMOSFET 25 and the output transistor 1 is set at 1. The current feedback ratio K depends on the size ratio of the output-side transistor in the current mirror circuit CM_n to the NMOSFET 31. Furthermore, if the variation of the feedback voltage VFB is represented by $\Delta$VFB and the variation of the output current IOUT is represented by $\Delta$IOUT, then at the connection node between the transconductance amplifier mentioned above and the current amplifier 24, the following formula (1) holds:

$$A(gm\Delta VFB - K\Delta IOUT) = IOUT \quad (1)$$

The above formula (1) can be rearranged as follows:

$$\Delta VFB = \frac{(K \cdot A + 1)}{A \cdot gm} \Delta IOUT \quad \text{[Formula 1]}$$

Thus, if $A \gg K$, $$\Delta VFB = \frac{K}{gm} \Delta IOUT$$

That is, when the gain A is large enough with respect to the current feedback ratio K, the variation $\Delta$VFB of the feedback voltage VFB is transmitted to the output of the linear power supply circuit without being affected by the phase characteristics of the current amplifier 24 and the output transistor 1. The product of the variation $\Delta$IOUT of the output current IOUT and the impedance of a parallel circuit formed by the output capacitor 7 and the load 8 equals the variation $\Delta$VOUT of the output voltage VOUT, and thus phase compensation can be completed solely with the pole in the parallel circuit formed by the output capacitor 7 and the load 8. This helps make the output capacitor 7 compact.

In the above description, making the gain A large enough with respect to the current feedback ratio K completely eliminates the influence, upon the frequency characteristics of the linear power supply circuit, of the phase characteristics of the current amplifier 24 except the phase characteristics of the current mirror circuit CM_1. Instead, unlike what has been described above, the gain A of the current amplifier 24 may be reduced to a certain degree so as to incompletely limit the influence, upon the frequency characteristics of the linear power supply circuit, of the phase characteristics of the current amplifier 24 except the phase characteristics of the current mirror circuit CM_1.

The current amplifier 24 and the feedback circuit 3 shown in FIG. 3 also function as an overcurrent protection circuit for the linear power supply circuit.

In FIG. 3, the input of the current-sink current mirror circuit CM_2 is the first predetermined point mentioned above. Hereinafter, the first predetermined point mentioned above is referred to as the connection node n1.

The feedback circuit 3 draws a current Ix commensurate with the information INF1 from the connection node n1. The current-sink current mirror circuit CM_2 draws from the connection node n1 a current Iy, which is the drain current of the input side-transistor in the current-sink current mirror circuit CM_2.

When the current Ia is zero, the sum current of the currents Ix and Iy is highest. The maximum value of the sum current of the currents Ix and Iy equals the current I1. Thus, the following formula (2) holds:

$$Ix+Iy \leq I1 \qquad (2)$$

Since both the currents Ix and Iy are substantially proportional to the current Ib, the above formula (2) can be rearranged as:

$$Ib \leq 1/C \text{ (where } C \text{ is a constant)}$$

Accordingly, even when the current Ib tends to increase according to the state of the load, the current Ib cannot increase beyond a limit. That is, overcurrent protection is performed on the current Ib.

Figure 4:
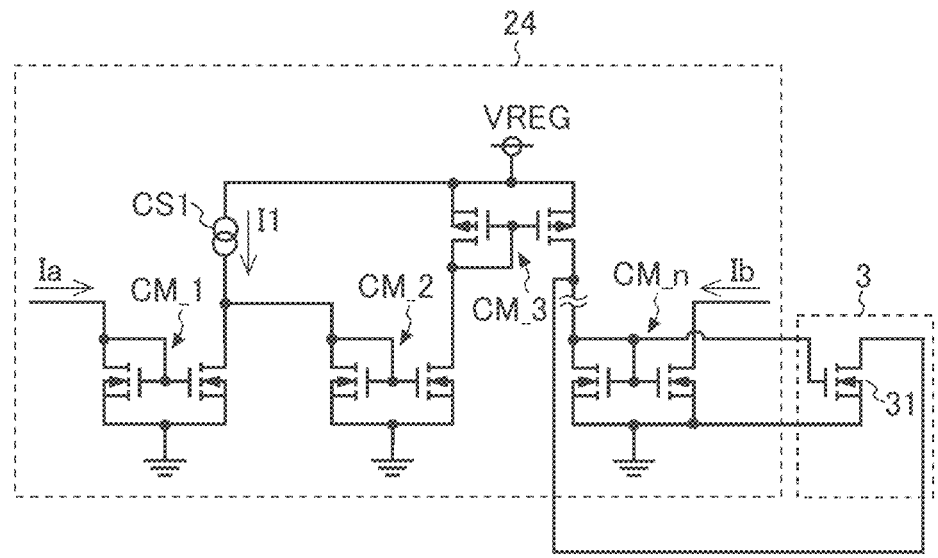
FIG. 4 A diagram showing another example of arrangement of the feedback circuit.

The first predetermined point mentioned above may be located closer, than it is shown to be in FIG. 3, to the output terminal T2. For example, as in the configuration example shown in FIG. 4, the NMOSFET 31 may feed the information INF1 back to the connection node between the current mirror circuits CM_3 and CM_4 (neither is illustrated in FIG. 4). In the configuration example shown in FIG. 4, the frequency characteristics of the linear power supply circuit can be designed with consideration given to the fact that the influence, on the frequency characteristics of the linear power supply circuit, of the phase characteristics of the current mirror circuits CM_2 and CM_3 cannot be suppressed by current feedback. The configuration example shown in FIG. 4, like the configuration example shown in FIG. 3, functions as an overcurrent protection circuit for the linear power supply circuit.

Figure 5:
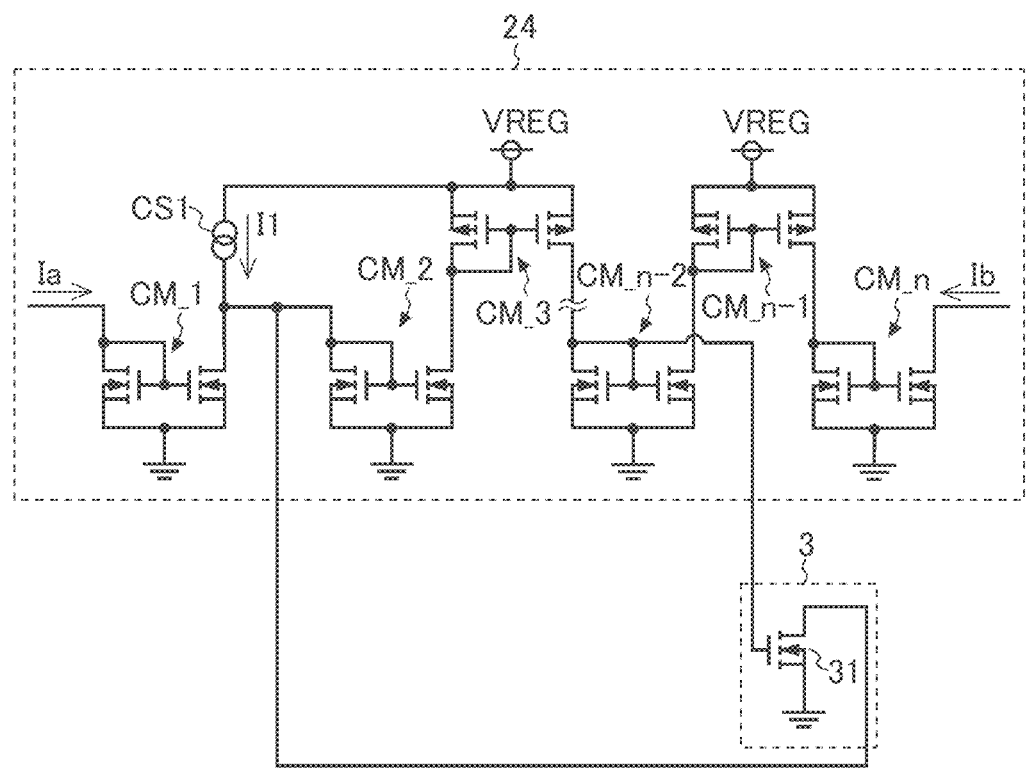
FIG. 5 A diagram showing yet another example of arrangement of the feedback circuit.

The second predetermined point mentioned above may be located closer, than it is shown to be in FIG. 3, to the input side of the current amplifier 24. For example, as in the configuration example shown in FIG. 5, the NMOSFET 31 may acquire the information INF' from the current mirror circuit CM_n−2. In the configuration example shown in FIG. 5, the frequency characteristics of the linear power supply circuit can be designed with consideration given to the fact that the influence, on the frequency characteristics of the linear power supply circuit, of the phase characteristics of the current mirror circuits CM_n−1 and CM_n cannot be suppressed by current feedback. The configuration example shown in FIG. 5, like the configuration example shown in FIG. 3, functions as an overcurrent protection circuit for the linear power supply circuit.

When the linear power supply circuit includes a phase compensation circuit that performs phase compensation, the phase compensation circuit can be provided elsewhere than between the first and second predetermined points described above. So arranged, the phase compensation circuit can perform desired phase compensation without being affected by current feedback.

3. Second Configuration Example

Figure 6A:
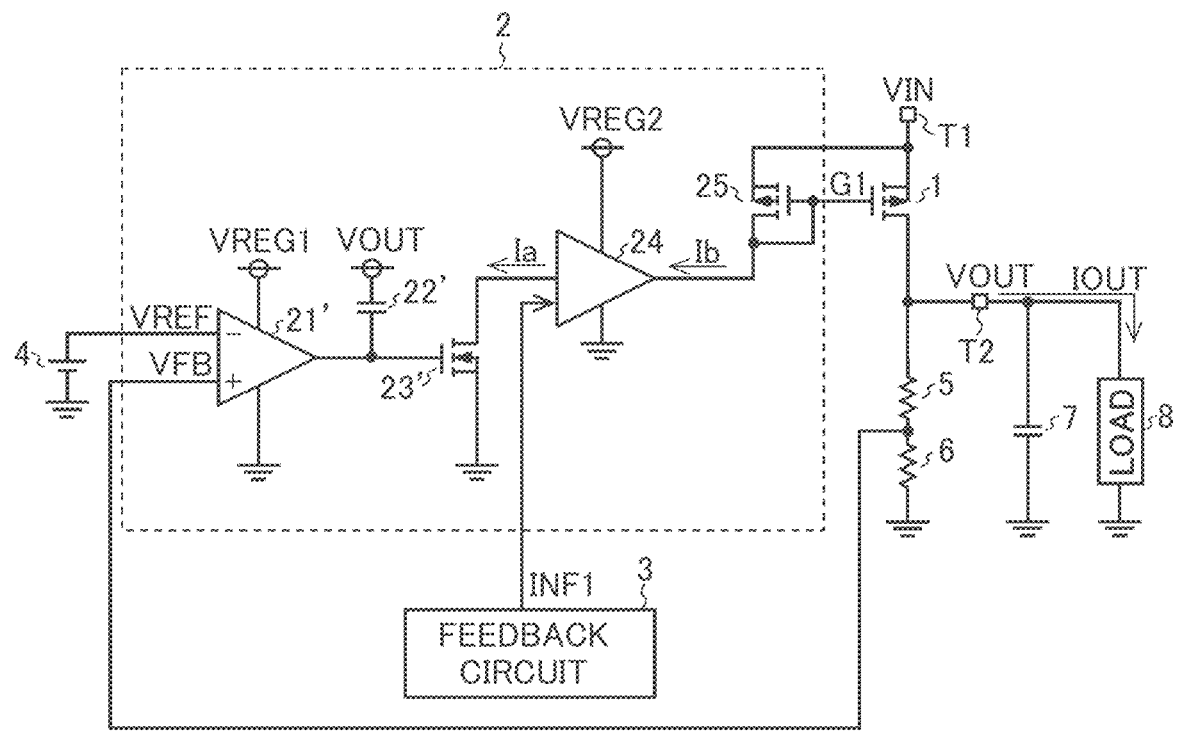
FIG. 6A A diagram showing a second configuration example of the linear power supply circuit shown in FIG. 1.

FIG. 6A is a diagram showing a second configuration example of the linear power supply circuit shown in FIG. 1. In FIG. 6A, such parts as find their counterparts in FIGS. 1 and 2 are identified by common reference signs, and no overlapping description will be repeated.

In this configuration example, the driver 2 includes a differential amplifier 21', a capacitor 22', an NMOSFET 23', a current amplifier 24, and a PMOSFET 25.

The differential amplifier 21' outputs a voltage commensurate with the difference between the feedback voltage VFB and the reference voltage VREF. The supply voltage for the differential amplifier 21' is a first constant voltage VREG1. That is, the differential amplifier 21' is driven by the voltage between the first constant voltage VREG1 and the ground potential.

The withstand voltage of the differential amplifier 21' is lower than the withstand voltage of the current amplifier 24. The gain of the differential amplifier 21' is lower than the gain of the current amplifier 24. This helps make the differential amplifier 21' compact.

One terminal of the capacitor 22' is fed with the output of the differential amplifier 21', and the other terminal of the capacitor 22' is fed with the output voltage VOUT. The other terminal of the capacitor 22 may be fed with, instead of the output voltage VOUT, a voltage that depends on the output voltage VOUT.

The source of the NMOSFET 23' is fed with the ground potential, and the gate of the NMOSFET 23' is fed with a voltage based on the output of the differential amplifier 21' (i.e., the voltage at the connection node between the differential amplifier 21' and the capacitor 22'). The NMOSFET 23' converts the voltage based on the output of the differential amplifier 21' into a current, which the NMOSFET 23' outputs from its drain. The connection node between the differential amplifier 21' and the capacitor 22' serves as an output voltage VOUT-ground (positive ground) in a high-frequency band, and this helps achieve fast response of the driver 2.

Figure 6B:
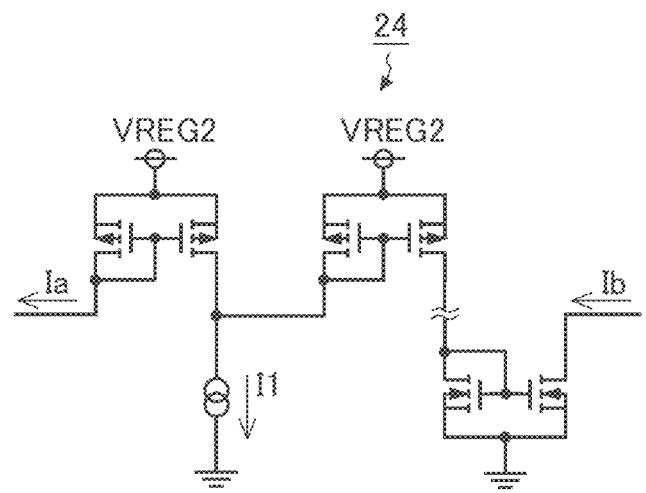
FIG. 6B A diagram showing one configuration example of the current amplifier.

The current amplifier 24 performs current amplification on the current Ia that is output from the drain of the NMOSFET 23'. The supply voltage for the current amplifier 24 is a second constant voltage VREG2. That is, the current amplifier 24 is driven by the voltage between the second constant voltage VREG2 and the ground potential. The first and second constant voltages VREG1 and VREG2 may have the same value, or may have different values. In this configuration example, the current Ia flows from the current amplifier 24 toward the NMOSFET 23', and thus the current amplifier 24 can be given, for example, the circuit configuration shown in FIG. 6B.

The second configuration example of the linear power supply circuit shown in FIG. 1 provides effects similar to those of the first configuration example of the linear power supply circuit shown in FIG. 1. The second configuration example of the linear power supply circuit shown in FIG. 1 can, even when the set value of the output voltage VOUT is low, ensure proper operation of the differential amplifier 21'. When a low voltage is used as the input voltage VIN, the input voltage VIN may be used, instead of the first and second constant voltages VREG1 and VREG2, as the supply voltages for the differential amplifier 21' and for the current amplifier 24 respectively.

4. Application

Figure 7A:
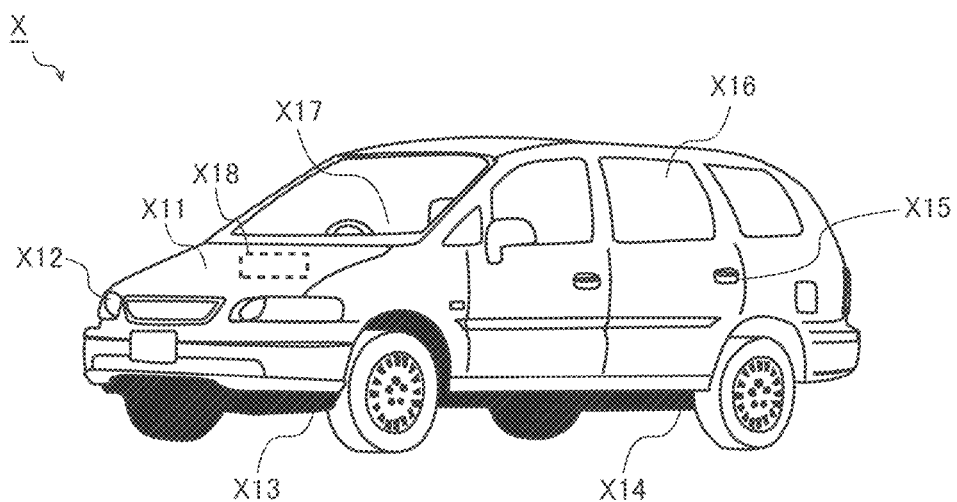
FIG. 7A An exterior view of a vehicle.

FIG. 7A is an exterior view of a vehicle X. The vehicle X of this configuration example incorporates various electronic appliances X11 to X18 that operate by being fed with a voltage supplied from an unillustrated battery. For the sake of convenience, FIG. 7A may not show the electronic appliances X11 to X18 at the positions where they are actually arranged.

The electronic appliance X11 is an engine control unit which performs control with respect to an engine (injection control, electronic throttle control, idling control, oxygen sensor heater control, automatic cruise control, etc.).

The electronic appliance X12 is a lamp control unit which controls the lighting and extinguishing of HIDs (high-intensity discharged lamps) and DRLs (daytime running lamps).

The electronic appliance X13 is a transmission control unit which performs control with respect to a transmission.

The electronic appliance X14 is a behavior control unit which performs control with respect to the movement of the vehicle X (ABS [anti-lock brake system] control, EPS [electric power steering] control, electronic suspension control, etc.).

The electronic appliance X15 is a security control unit which drives and controls door locks, burglar alarms, and the like.

The electronic appliance X16 comprises electronic appliances incorporated in the vehicle X as standard or manufacturer-fitted equipment at the stage of factory shipment, such as wipers, power side mirrors, power windows, dampers (shock absorbers), a power sun roof, and power seats.

The electronic appliance X17 comprises electronic appliances fitted to the vehicle X optionally as user-fitted equipment, such as A/V (audio/visual) equipment, a car navigation system, and an ETC (electronic toll collection system).

The electronic appliance X18 comprises electronic appliances provided with high-withstand-voltage motors, such as a vehicle-mounted blower, an oil pump, a water pump, and a battery cooling fan.

Any of the linear power supply circuits described previously can be built in any of the electronic appliances X11 to X18.

Figure 7B:
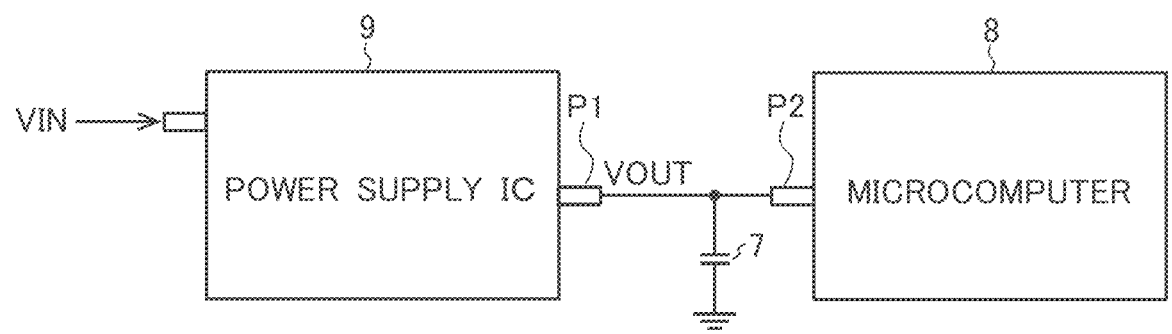
FIG. 7B A diagram showing interconnection between a power supply IC and a microcomputer.

FIG. 7B is a diagram showing the interconnection between a power supply IC (semiconductor integrated circuit device) 9 and a microcomputer (load) 8. An external pin P1 of the power supply IC (semiconductor integrated circuit device) 9 and an external pin P2 of the microcomputer (load) 8 are connected together. The external pin P1 is a pin for external output of the output voltage VOUT, and the external pin P2 is a pin for input of the supply voltage from outside.

To the external pins P1 and P2, an output capacitor 7 is connected, which is a component externally fitted to the power supply IC (semiconductor integrated circuit device) 9 and the microcomputer (load) 8. When the power supply IC (semiconductor integrated circuit device) 9 is a semiconductor integrated circuit device that incorporates the linear power supply circuit described previously, the electrostatic capacitance of the output capacitor 7 can be reduced to, for example, about 100 nF.

On the other hand, when the power supply IC (semiconductor integrated circuit device) 9 is a semiconductor integrated circuit device that incorporates a conventional linear power supply circuit, the electrostatic capacitance of the output capacitor 7 needs to be, for example, about 1 µF and in addition, separately from the output capacitor 7, a capacitor of about 100 nF needs to be connected, as a component externally fitted to the microcomputer (load) 8, to the external pins P1 and P2.

Thus, employing a semiconductor integrated circuit device that incorporates the linear power supply circuit described previously as the power supply IC (semiconductor integrated circuit device) 9 allows easy designing of the power supply of the microcomputer (load) 8.

MODIFIED EXAMPLES

The embodiments disclosed herein should be considered to be in every aspect illustrative and not restrictive, and the technical scope of the present invention is defined not by the description of embodiments given above but by the scope of the appended claims and should be understood to encompass any modifications within a spirit and scope equivalent to the claims.

Figure 8:
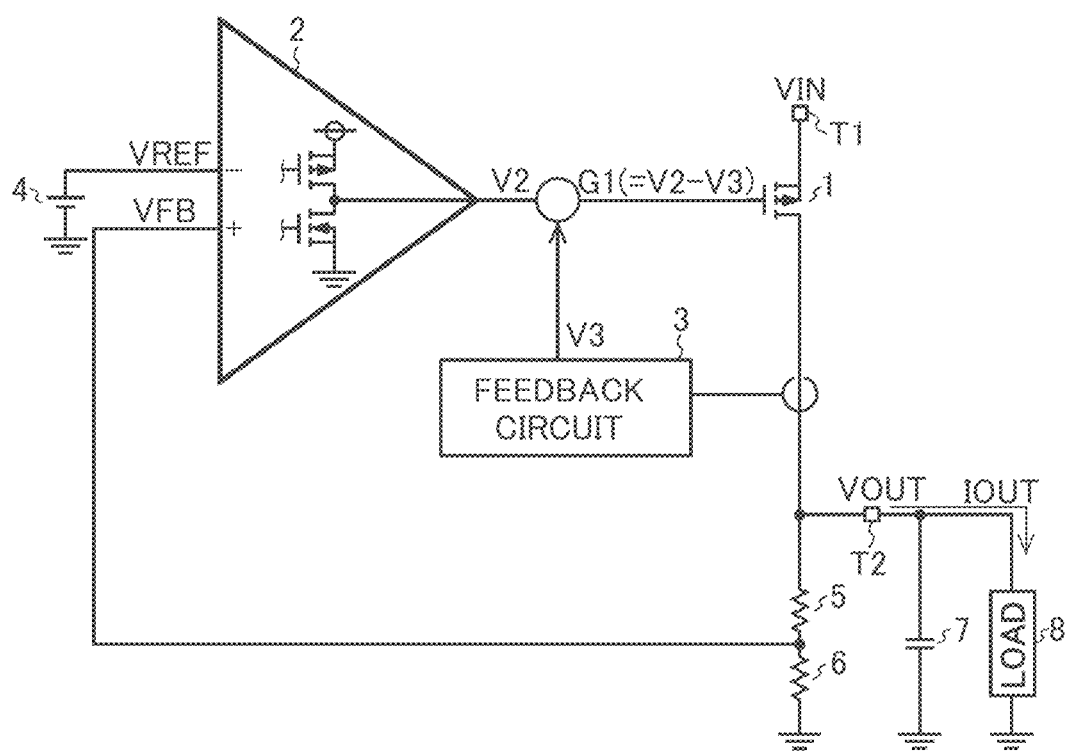
FIG. 8 A diagram showing a modified example of the linear power supply circuit.
Figure 9:
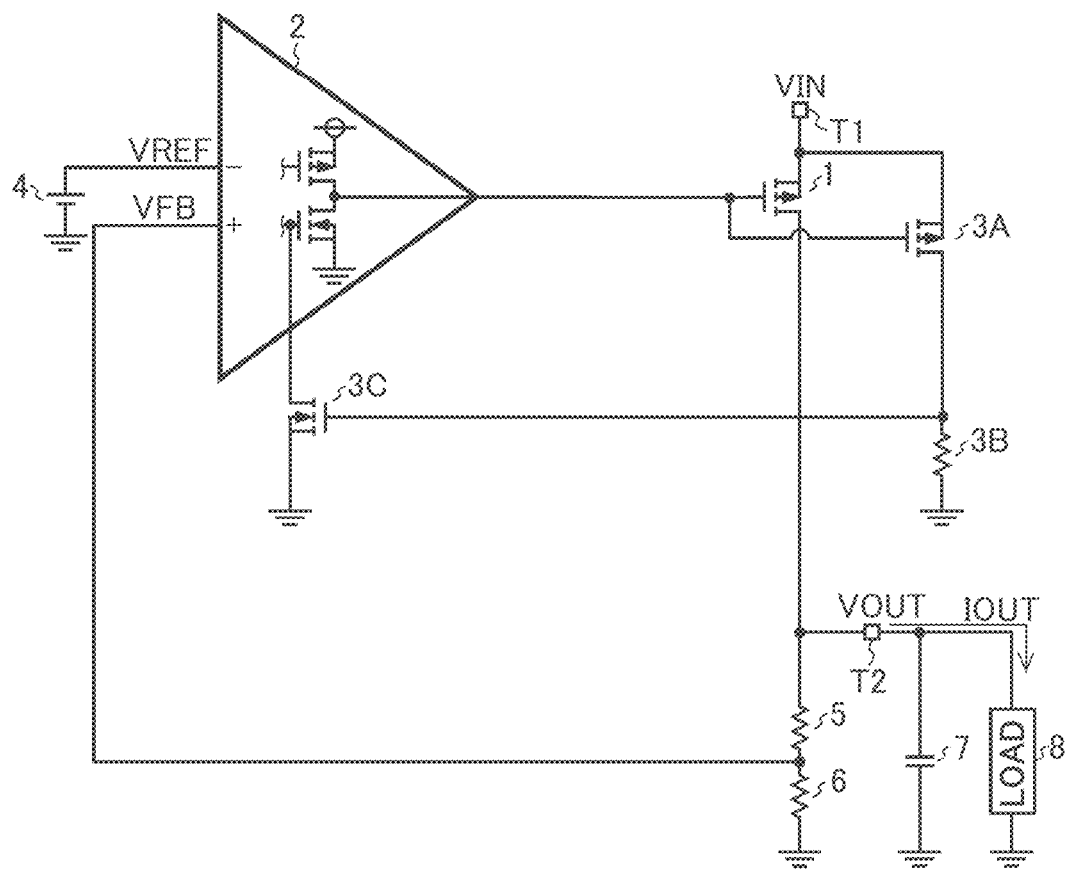
FIG. 9 A diagram showing another modified example of the linear power supply circuit.

In the first and second configuration examples described above, the output transistor 1 is part of the current mirror circuit. Instead, the output stage of the driver 2 may be of a push-pull type as shown in FIGS. 8 and 9. In the configuration shown in FIG. 8, the feedback circuit 3 feeds a voltage V3 commensurate with the output current IOUT back to the output V2 of the driver 2. This helps suppress poles in a low-frequency band ascribable to a parasitic capacitance in the output transistor 1. In the configuration shown in FIG. 9, the feedback circuit 3 is formed by a PMOSFET 3A, a resistor 3B, and an NMOSFET 3C. The drain current of the NMOSFET 3C depends on the voltage proportional to the current that is output from the PMOSFET 3A, which, together with the output transistor 1, forms the current mirror circuit. The drain current of the NMOSFET 3C is drawn from the gate of the second transistor in the output stage of the driver 2 (i.e., the transistor provided between the output terminal of the driver 2 and the ground potential). This helps suppress poles in a low-frequency band ascribable to a parasitic capacitance in the output transistor 1. In the configuration shown in FIG. 9, the feedback circuit 3 feeds information on the output current IOUT back to the output stage of the driver 2. Instead, information on the output current IOUT may be fed back to anywhere between the input terminal of the driver 2 and the output stage.

LIST OF REFERENCE SIGNS 1 output transistor
2 driver
3 feedback circuit
21, 21' differential amplifier
22, 22' capacitor
23 PMOSFET (one example of a converter)
23' NMOSFET (another example of a converter)
24 current amplifier
X vehicle

The invention claimed is:
1. A linear power supply circuit comprising:
an output transistor provided between an input terminal and an output terminal, wherein the input terminal is operable to receive an input voltage, and wherein the output terminal is operable to receive an output voltage;
a driver configured to drive the output transistor; and
a feedback circuit configured to feed, back to the driver, information on an output current fed out via the output terminal,
wherein:
the driver is configured to drive the output transistor based on:
a difference between a voltage based on the output voltage and a reference voltage, and
the information, the driver includes a differential amplifier configured to output a voltage commensurate with the difference between the voltage based on the output voltage and the reference voltage, the feedback circuit is configured to feed the information back to a first predetermined point across a first path between an output of the differential amplifier and the output terminal, the feedback circuit is configured to draw a current commensurate with the information from the first predetermined point, the driver further includes:
 a converter configured to convert a voltage based on the output of the differential amplifier into a current and output the current; and
 a current amplifier configured to perform current amplification on an output of the converter, the feedback circuit is configured to acquire the information from a second predetermined point across a second path between an input of the current amplifier and the output terminal, the second predetermined point being located closer, than the first predetermined point, to the output terminal, the feedback circuit is configured to feed the information back to the current amplifier, the current amplifier includes a plurality of current-sink current mirror circuits and a plurality of current-source current mirror circuits, an input of one of the current-sink current mirror circuits is the first predetermined point, and a maximum value of a sum current of the current drawn from the first predetermined point by the feedback circuit and a current drawn from the first predetermined point by the current-sink current mirror circuit of which the input is the first predetermined point does not depend on the output of the converter.

2. A linear power supply circuit comprising:
an output transistor provided between an input terminal and an output terminal, wherein the input terminal is operable to receive an input voltage, and wherein the output terminal is operable to receive an output voltage;
a driver configured to drive the output transistor; and
a feedback circuit configured to feed, back to the driver, information on an output current fed out via the output terminal,
wherein:
the driver is configured to drive the output transistor based on:
 a difference between a voltage based on the output voltage and a reference voltage, and
 the information,
the driver includes a differential amplifier configured to output a voltage commensurate with the difference between the voltage based on the output voltage and the reference voltage,
the feedback circuit is configured to feed the information back to a first predetermined point across a first path between an output of the differential amplifier and the output terminal,
the feedback circuit is configured to draw a current commensurate with the information from the first predetermined point,
the driver further includes a capacitor of which one terminal is fed with the output of the differential amplifier and of which another terminal is fed with a ground potential, and
a supply voltage for the differential amplifier is the voltage based on the output voltage.

3. A linear power supply circuit comprising:
an output transistor provided between an input terminal and an output terminal, wherein the input terminal is operable to receive an input voltage, and wherein the output terminal is operable to receive an output voltage;
a driver configured to drive the output transistor; and
a feedback circuit configured to feed, back to the driver, information on an output current fed out via the output terminal,
wherein:
the driver is configured to drive the output transistor based on:
 a difference between a voltage based on the output voltage and a reference voltage, and
 the information,
the driver includes a differential amplifier configured to output a voltage commensurate with the difference between the voltage based on the output voltage and the reference voltage,
the feedback circuit is configured to feed the information back to a first predetermined point across a first path between an output of the differential amplifier and the output terminal,
the feedback circuit is configured to draw a current commensurate with the information from the first predetermined point,
the driver further includes:
 a converter configured to convert a voltage based on the output of the differential amplifier into a current and output the current; and
 a current amplifier configured to perform current amplification on an output of the converter,
the feedback circuit is configured to feed the information back to the current amplifier,
the driver further includes a capacitor of which one terminal is fed with the output of the differential amplifier and of which another terminal is fed with a ground potential,
a supply voltage for the differential amplifier is the voltage based on the output voltage,
a supply voltage for the converter is the voltage based on the output voltage, and
a supply voltage for the current amplifier is a constant voltage.

4. The linear power supply circuit according to claim 3, wherein a withstand voltage of the differential amplifier is lower than a withstand voltage of the current amplifier.

5. The linear power supply circuit according to claim 3, wherein a gain of the differential amplifier is lower than a gain of the current amplifier.

6. A linear power supply circuit comprising:
an output transistor provided between an input terminal and an output terminal, wherein the input terminal is operable to receive an input voltage, and wherein the output terminal is operable to receive an output voltage;
a driver configured to drive the output transistor; and
a feedback circuit configured to feed, back to the driver, information on an output current fed out via the output terminal,
wherein:
the driver is configured to drive the output transistor based on:
 a difference between a voltage based on the output voltage and a reference voltage, and
 the information, the driver includes a differential amplifier configured to output a voltage commensurate with the difference between the voltage based on the output voltage and the reference voltage, the feedback circuit is configured to feed the information back to a first predetermined point across a first path between an output of the differential amplifier and the output terminal, the feedback circuit is configured to draw a current commensurate with the information from the first predetermined point, the driver further includes:
  a converter configured to convert a voltage based on the output of the differential amplifier into a current and output the current; and
  a current amplifier configured to perform current amplification on an output of the converter, the feedback circuit is configured to feed the information back to the current amplifier, the driver further includes a capacitor of which one terminal is fed with the output of the differential amplifier and of which another terminal is fed with the voltage based on the output voltage, and either a supply voltage for the differential amplifier is a first constant voltage and a supply voltage for the current amplifier is a second constant voltage, or the supply voltage for the differential amplifier and the supply voltage for the current amplifier are the input voltage.

\* \* \* \* \*